April 7, 1953     M. VECCHIONI     2,633,888

SKID CHAIN

Filed June 11, 1949

INVENTOR,
Mario Vecchioni
BY J. J. Dowling
ATTORNEY

Patented Apr. 7, 1953

2,633,888

UNITED STATES PATENT OFFICE 2,633,888

SKID CHAIN

Mario Vecchioni, Baltimore, Md.

Application June 11, 1949, Serial No. 98,443

1 Claim. (Cl. 152—239)

My invention relates to a skid chain and the objects thereof are to make a skid chain that will consist of a few parts, be economical to manufacture, and one that will have interconnecting links in close formation to form a mat-like tread surface to provide an anti-skid surface when applied to a tire.

A further object of this invention is to provide a chain to assist in eliminating skidding when on a tire, and consists of a series of connected links forming spaced parallel circumferential lengths and a plurality of transverse links connected to the parallel lengths to provide, when completed, a mat-like structure that will provide easy riding and at the same time will eliminate skidding and give further traction to the tires.

A still further object of my invention is the provision of a skid chain so constructed by the interconnection of links that it will embrace the tread and side walls of a tire shoe on which it is placed so as to prevent skidding of the tire and also guard the side walls against injury during the use thereof.

With these and other objects in view, the invention consists of certain novel features, combination and arrangement of parts as will be hereinafter more fully described, pointed out in the accompanying drawing, and claimed.

Figure 1:
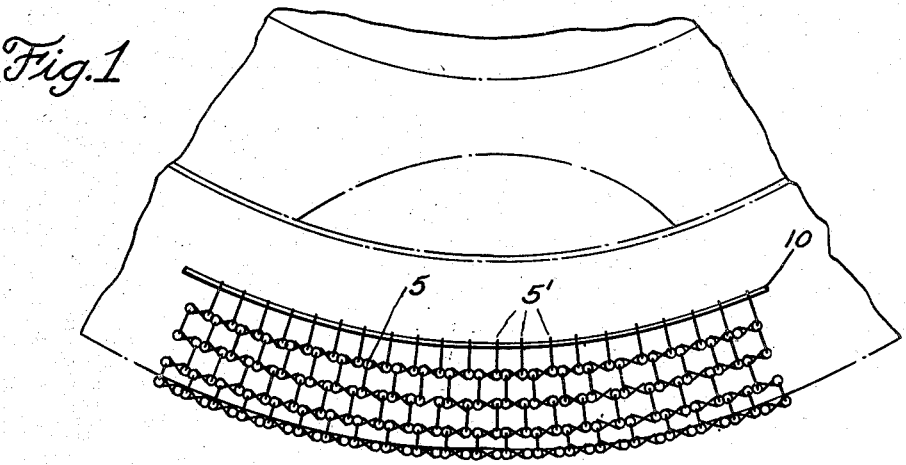
Figure 1 is a fragmentary, side elevational view, partly broken away, illustrating the chain as applied to a tire, showing the side wall and tread surfaces thereof.
Figure 2:
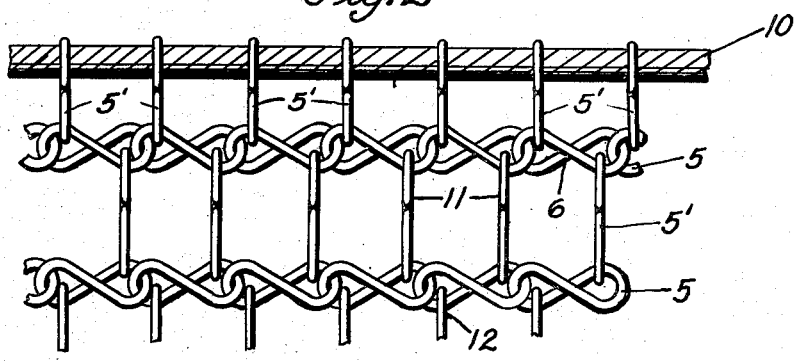
Figure 2 is an enlarged, fragmentary, side elevational view, showing the parallel and transverse links connected together and the fastening cable carried thereby; and, Figure 3 is a transverse, sectional view, showing the chain as applied to a tire shoe.
Figure 3:
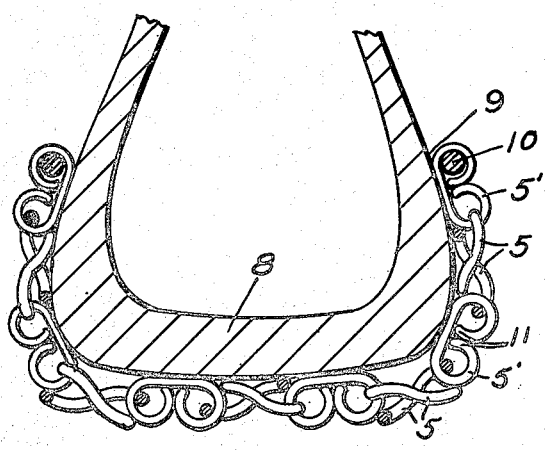

It is well known in the manufacturing of tire chains that the cross links and the method of connecting them produces a chain that causes uncomfortable riding, due to the spacing of the links and the method of construction thereof, and it is the aim of the present invention to provide a structure wherein the links are so closely related that a mat-like structure will be produced which will provide easy and comfortable riding and at the same time will prevent and eliminate skidding.

My chain further provides means for protecting the side walls of the tire shoe to which it is applied, due to the fact that the structure provides a flexible body which allows the chain to embrace the tread and side walls radially inwardly of the medial line thereof, to such a point as to provide a guard-like structure of the side walls of the tire shoe.

In the making of my invention, I provide a series of links which form parallel circumferential lengths and these lengths are arranged and held at a spaced distance apart by individual transverse links which are also spaced apart, and when completed as a unit, provide a skid chain with a mat-like tread surface and of such width as to embrace the side walls of a tire radially inwardly of the medial line thereof. Thus there is provided a chain which gives easy and comfortable riding and at the same time a complete skidding surface and a guard against injury to the outside walls of the tire.

The chain in its entirety is made up of twisted links 5, and these links 5 are connected endwise to provide continuous, circumferential, parallel lengths 6, and these lengths 6 are held in spaced relation to one another by transversely disposed spaced links 5' connected by their opposite ends to the lengths 6 and at spaced distance apart to provide the mat surface 7, which constitutes the tread when affixed to a tire 8. The width of the chain, when completed, extends around the side walls of the tire radially inwardly of the medial line 9 thereof, thus providing guards for this area of the tire against injury during the striking of curbs or other obstructions which is so common in the driving of motor vehicles.

The links 5', connected to the extreme outside parallel lengths 6, have arranged in their free ends a flexible connecting cable 10, which cable is provided with suitable fastening means, not shown, wherein the chain may be easily and quickly affixed to a tire or removed therefrom at the will of the operator.

The essential feature of my invention is that the chain, when completed as a unit by virtue of its links, can be reversed either with the smooth portions exteriorly or the clamped portions exteriorly, this being optional to the user.

It can be seen in the making of the links 5 that they have their body portions twisted and interlinked together, while the links 5' are straight with their opposite ends turned back upon themselves, as at 11, to provide eyes 12 so that they may be connected in the eyes of the parallel links 5. Thus there is provided a closely related structure with parallel lengths and transverse links connecting the lengths to form the mat and guard structure.

It is to be understood that certain minor features and changes may be resorted to without departing from the spirit and scope of the invention as claimed.

I claim:

A skid chain comprising a plurality of longitudinally disposed spaced links connected together endwise forming a series of continuous parallel lengths, a plurality of spaced transversely disposed straight links having their ends connected to the longitudinally disposed links at spaced distance apart and arranged to hold the continuous lengths at spaced distance apart to form a mat-like tread surface and a complete tire-embracing chain, and flexible means secured in certain portions of said straight links carried by certain of said longitudinally disposed links to retain the unit as a whole in tire-engaging position.

MARIO VECCHIONI.

REFERENCES CITED

The following references are of record in the file of this patent:

UNITED STATES PATENTS

| Number | Name | Date |
|---|---|---|
| 806,520 | Canne | Dec. 5, 1905 |
| 911,585 | Fox | Feb. 9, 1909 |
| 1,027,450 | Thompson | May 28, 1912 |

FOREIGN PATENTS

| Number | Country | Date |
|---|---|---|
| 4,219 | France | Apr. 17, 1905 |
| 139,165 | Austria | Oct. 25, 1934 |